United States Patent [19]

Micic et al.

[11] Patent Number: 5,170,258
[45] Date of Patent: Dec. 8, 1992

[54] PROJECTION TELEVISION SYSTEM EMPLOYING OPTICS THROUGH WHICH TRANSMITTED INFRARED TELEVISION SIGNALS ARE RECEIVED

[75] Inventors: Ljubomir Micic, Freiburg; Klaus Heberle, Reute, both of Fed. Rep. of Germany

[73] Assignee: Deutsche ITT Industries GmbH, Freiburg, Fed. Rep. of Germany

[21] Appl. No.: 784,494

[22] Filed: Oct. 29, 1991

[30] Foreign Application Priority Data

Nov. 6, 1990 [EP] European Pat. Off. ........ 90121212.6

[51] Int. Cl.$^5$ ...................... H04N 9/31; H04N 5/74; H04N 5/33
[52] U.S. Cl. .................................. 358/60; 358/231; 358/113
[58] Field of Search .............. 358/60, 113, 56, 64, 358/93, 230, 231, 237; 359/350, 113, 129, 131, 143

[56] References Cited

U.S. PATENT DOCUMENTS

| | | | |
|---|---|---|---|
| 4,019,180 | 4/1977 | Graves | 358/113 |
| 4,786,966 | 11/1988 | Hanson et al. | 358/108 |
| 4,916,532 | 4/1990 | Streck et al. | 358/83 |

FOREIGN PATENT DOCUMENTS 2118803 11/1983 United Kingdom .................. 358/56

OTHER PUBLICATIONS

Patent Abstracts of Japan; vol. 13, Number 570, (pp. 977), 3918; Dec. 18, 1989; Data Projector Device; Pat. Appl. 1-237592.
Patent Abstracts of Japan; vol. 12; Number 204 (E-620) 3051; Jan. 11, 1988; Remote Control Device Built in Television Receiver; Pat. Appl. 63-2476.

*Primary Examiner*—James J. Groody
*Assistant Examiner*—S. Metjahic
*Attorney, Agent, or Firm*—Thomas L. Peterson

[57] ABSTRACT

A projection television system includes a projection unit having an optical element through which infrared television signals are received. The received signals are processed to provide a television image display which is projected for viewing. Received television signals from a TV station or cable are converted to infrared signals and transmitted along a given axis of an infrared transmission link extending between an infrared transmitter, remotely positioned from the projection unit, to an infrared detector, located in the projection unit. The detector converts the infrared TV signal into a video signal which signal is processed by the projection receiver to provide the image for display. The infrared transmitter, the optical element and the detector are aligned along a given axis which is also the optical axis of the system.

11 Claims, 1 Drawing Sheet

PROJECTION TELEVISION SYSTEM EMPLOYING OPTICS THROUGH WHICH TRANSMITTED INFRARED TELEVISION SIGNALS ARE RECEIVED

FIELD OF THE INVENTION

The present invention relates to projection television systems, and more particularly, to a projection television system which receives transmitted infrared television signals from which a video signal is provided and used by a projection television unit in the system.

BACKGROUND OF THE INVENTION

The video and television industries are replete with apparatus and systems that transmit a television signal in free space to television receivers which process the signal to provide a displayed image on a television screen. The television signal is converted or shifted to a frequency or wavelength for wireless transmission depending upon equipment employed, atmospheric conditions or the environment in which the apparatus and systems operate.

For example, Japanese Patent Application No. 63-65248 entitled DATA PROJECTOR DEVICE discloses converting data into an FM modulating signal for transmission and then converting the received signal into a digital signal for display on an LCD screen.

In addition, some apparatus and systems transmit image or television signals along infrared wavelengths for military applications such as the system disclosed in U.S. Pat. No. 4,786,966 to Hanson et al.

Other apparatus and systems employ infrared signals to remotely control and operate circuitry or systems such as the system disclosed in U.S. Pat. No. 4,916,532 to Streck et al. This patent discloses a wireless local TV transmission system for cable or other uses. See also, Japanese Patent Application No. 61-145406 entitled REMOTE CONTROL DEVICE BUILT IN TELEVISION RECEIVER for the wireless transmission of television signals.

However, the foregoing apparatus and systems would require relatively considerable transmission power and costly and intricate optical arrangements if implemented for use with projection television systems.

It is therefore an object of the present invention to provide a projection television system or receiver with projection optics through which infrared television signals that are remotely generated propagate through for processing by the receiver. Use of the same optics for both the infrared and projection signals requires fewer elements and simpler fabrication of the system's projection unit, and therefore, reduces power demand at the system without sacrificing the quality of the image projected.

It is also an object of the present invention to position the projection unit, the optics and a transmitter for the infrared signal all along a common optical axis so that different optical elements or lenses can be easily employed depending upon the manner in which the image is to be projected.

SUMMARY OF THE INVENTION

A projection television system comprising means for transmitting an infrared television signal along a given axis; and a projection television means including projection optics adapted to receive said transmitted infrared signal via said optics, including means for converting said received signal via said optics into an image signal and for returning said image signal to be displayed at a remote location through said projection optics.

BRIEF DESCRIPTION OF THE DRAWINGS

For a more complete understanding of the present invention, reference may be had to the following description of an exemplary embodiment considered in connection with the accompanying drawings, in which.

DETAILED DESCRIPTION OF THE DRAWINGS

Figure 1:
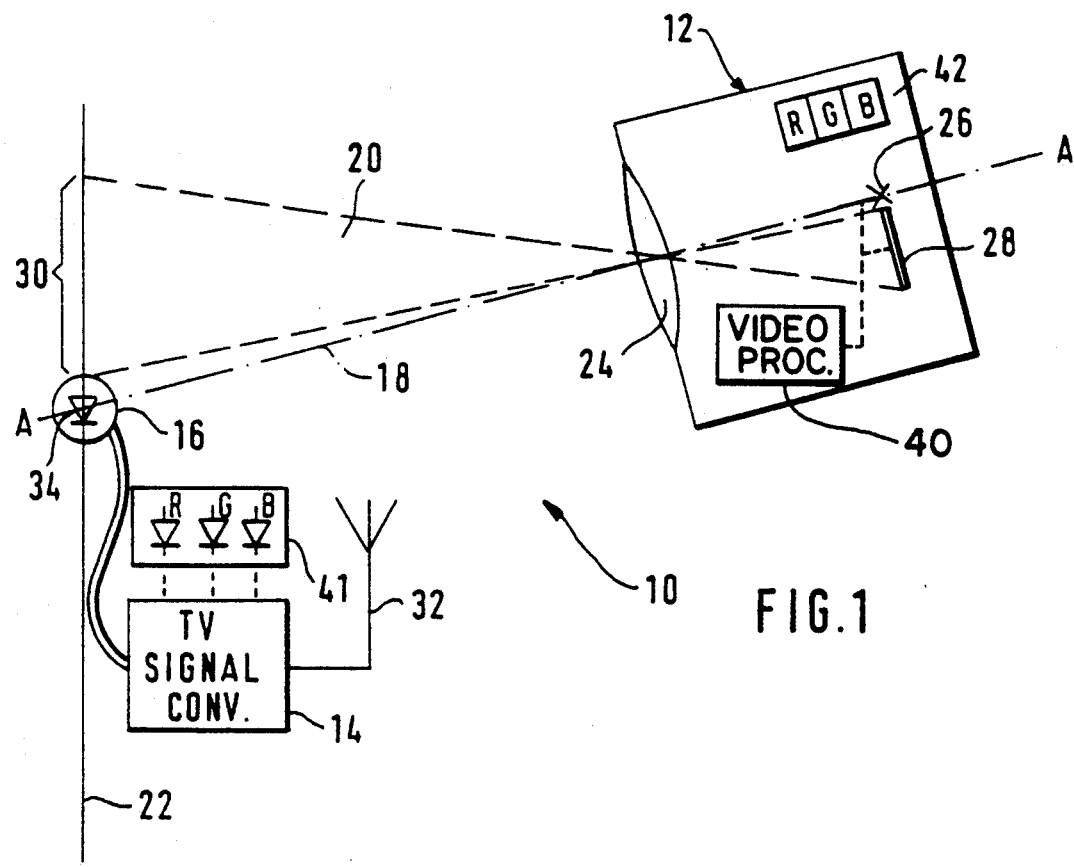
FIG. 1 illustrates a projection television system of the present invention.

With reference to FIG. 1, a television projection system 10 is shown which includes a television projection receiver or unit 12, a signal converter 14 and a signal transmitter 16. The projection unit 12 is designed to receive infrared television signals transmitted over an infrared transmission link 18 and to project an image signal 20 onto a screen 22. The signal converter 14 and the signal transmitter 16 are exterior to and remotely positioned from the projection unit 12.

The projection unit 12 includes an optical element or lens system 24, an infrared detector 26 and an image producer 28. The optical element 24 is positioned to face the screen 22 so that the television signals of the infrared transmission link 18 can pass through the optical element to be concentrated or focused on the infrared detector. The image signal 20 also passes through the optical element to be projected on the screen. The infrared detector 26 and the image producer 28 are arranged inside the projection unit 12 with the infrared detector positioned above the image producer. The infrared detector 26 receives the infrared television signals passing through the optical element 24 and is coupled to a receiver or video processor 40 which employs electronic filters and amplifiers to generate television signals from the electrical output signal of the infrared detector 26. The image producer 28 projects the television signals back through the optical element 24 onto an area 30 of the screen 22. Many different types of optical elements or lenses may be employed through which the infrared signal is received and the image signal is projected, such as optical elements having zoom capabilities. However, use of zoom lenses or the like is merely by way of example and it is understood that other lenses can be employed with the projection unit 12 depending upon the manner in which the image is to be projected.

The signal converter 14 receives television signals by way of an antenna 32 or other conventional wiring assemblies (not shown) for the projection television system 10 and converts the television signals into infrared signals which are supplied to the signal transmitter 16. The television signal received may be a conventional compatible TV signal as transmitted by a TV station or cable company or any other means such as a NTSC or PAL signal. The TV signal may be transmitted in analog or digital form as a composite color signal or in analog or digital form as R, G and B signals with associated horizontal and vertical synchronizing signals. Projection television receivers are well know. Projection TV systems have been developed for large screen projection of television pictures including the 3-CRT, Eidophor and single gun light valve systems. For domestic use, three cathode ray tubes, with a typical raster diagonal of 3-5", produce 3 rasters in red, green and blue, being driven by the respective R, G and B drive signals. The images are projected through three wide aperture lenses to either a higher reflective screen (front projection) as for example shown in FIG. 1, or to the back of a diffused translucent screen (rear projection). By adjustment of the deflection and orientation of the CRTs and lenses, the separate rasters are brought into registration and geometric congruence. Thus, projection television systems are widely known and widely employed and other projection systems are based on light valves using electro-optic crystals, metallic films and liquid crystals are constantly being developed as for example a system using high power lasers which produce superimposed image in the three primary colors. All such systems are associated with suitable lens assemblies for projection, such as the lens assembly 24 shown in FIG. 1.

In a similar manner, a typical television signal, such as the NTSC signal used in the United States or the PAL signal, can be conventionally converted by many techniques into other corresponding signals, such as for use with microwave links, infrared links or other optical frequencies as well. Infrared signals are employed because they are efficient, require relatively low power to implement and are relatively inexpensive for implementing the transmission link between the signal transmitter 16 and the infrared detector 26. In addition, the infrared signals are compatible with and easily pass through optical elements having different focusing characteristics.

Figure 2:
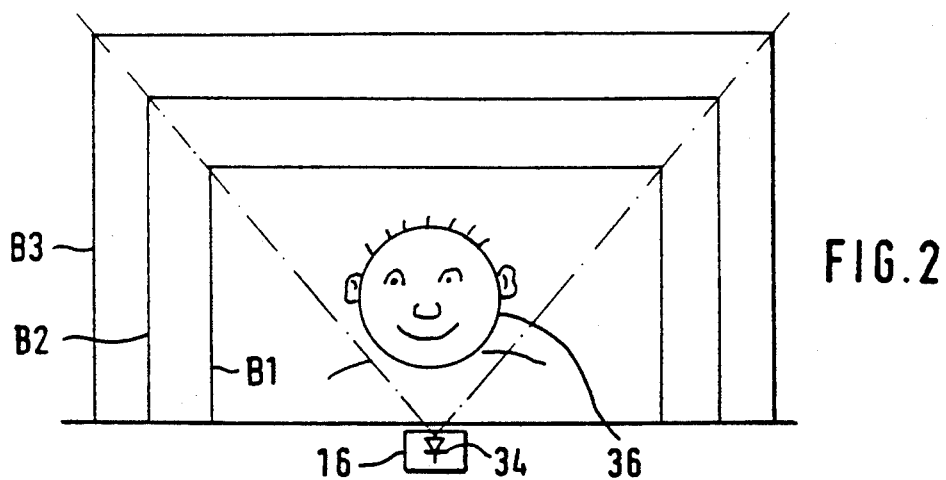
FIG. 2 illustrates an image projected from the projection television system, the image being alterable to have different sizes.

The signal transmitter 16 transmits the television signals 20 as infrared signals and is positioned below the area 30 of the screen 22 upon which the image signals are to be projected. The optical axis is at a given angle due to the fact that the transmitter 16 is below the projection unit. The projection unit 12 may be attached to a ceiling suspension as those employed in hospitals or otherwise secured as shown. The signal transmitter 16 includes a diode 34 such as an LED or laser diode operating in the infrared band. The diode 34 is positioned near one end of an optical axis A-A along which the infrared transmission link 18 is established. The infrared transmission link 18 extends along the optical axis A—A from the diode 34 through the optical element or lens system 24 to the infrared detector 26 positioned at the opposite end of the infrared transmission link. The infrared detector 26 is typically a photodetector or photodiode responsive to infrared radiation. The diode 34 is positioned within a distance within the optical axis A—A, as shown in FIG. The signal transmitter 16 is also positioned within the range of the optical axis so that a line of sight transmission link is provided. However, one could employ reflectors or folded optics to cause the transmission link to assume any path as long as both the infrared signal and the projected image pass through the common lens or optical element 24. The infrared detector 26 can therefore be positioned on the optical axis regardless of the distance over which the image signal is to be projected so that even during zoom applications, different sizes of an image 36 can be projected on the screen area 30 such as those represented by B1, B2 and B3 in FIG. 2.

It is preferable to mount the projection unit 12 away from any structures or other objects which might interfere with the infrared transmission link between the signal transmitter 16 and the projection unit. Mounting the projection unit 12 off the floor proximate to the ceiling would also overcome disturbances to the infrared signal caused by viewers or other individuals passing between the signal transmitter and the projection unit and interfering with the infrared transmission link 18.

The infrared television signal is transmitted in analog or digital form 's a composite color signal or in analog or digital form as red, green and blue signals with the associated synchronizing signals as indicated. Three separate diodes can be employed in lieu of diode 16, one for RED, BLUE and GREEN as shown in module 41. The three diodes are driven by the converter 14 and transmit the signals via infrared links to three detectors as shown in module 42 in place of the single detector 26. The detectors 42 are R, G and B detectors and develop the corresponding signals according to the received signals from diodes 41.

When the three spacially separated transmitter diodes 41 are employed to transmit the infrared television signal as red, green and blue signals, the three infrared detectors 42, spacially separated within the projection unit are also employed, each of which detects a corresponding one of the transmitted infrared signals. By positioning the three infrared detectors in the plane of the optical axis A-A, only a lateral shift of the two outermost detectors is required when employing different projection distances or when zooming with the optical element 24.

Figure 3:
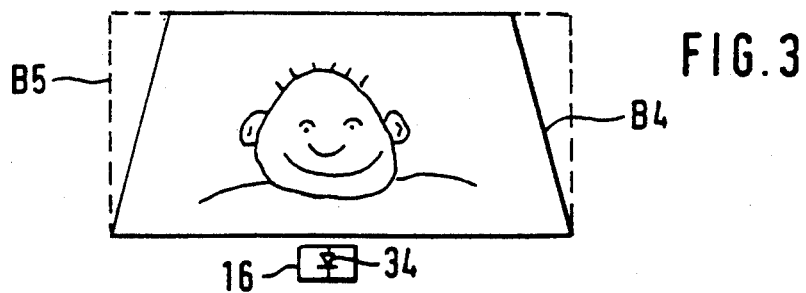
FIG. 3 illustrates the image being adjusted so that it is correctly displayed when projected.

Correction and adjustment of the image 36 to be projected can be implemented as indicated in FIG. 3 when the infrared detector 26 is designed and employed as a multiple split element. In this manner, the image to be projected is distorted on the multiple split element or detector as indicated by B4. For example, three detectors may be used in place of a single detector to receive R, G and B signals or otherwise. The detectors may be adjacent one another or one detector on the right and one on the left of a central detector. Each detector as well as each transmitting diode is relatively of the same area having the same patterns for transmit and receive. Thus the three video images will be offset and not properly registered. But one can easily detect the affect from the displayed image. This can be compensated for electrically or optically. By observing and evaluating the distorted image B4 on the multiple split element, the necessary adjustment to the distorted image can be determined and a corresponding electronic or optical correction signal indicated by the dashed line B5 can be applied to the distorted image prior to its being projected onto the screen.

The power required to operate the infrared transmission link, and therefore the projection television system, is kept relatively low because the infrared signal and the image signal are being transmitted simultaneously through the same optical element. The projection system is benefitted by requiring fewer parts and less power to receive and project the television image signals thereby reducing mechanical, optical and electrical problems associated with these types of televisions systems.

It will be understood that the embodiment described herein is merely exemplary and that a person skilled in the art may make many variations and modifications without departing from the spirit and scope of the invention. All such modifications and variations are intended to be included within the scope of the invention as defined by the appended claims.

What is claimed is:

1. A projection television system comprising:
   means for transmitting an infrared television signal along a given axis; and
   a projection television means including projection optics adapted to receive said transmitted infrared signal via said optics, including means for converting said received signal via said optics into an image signal and for returning said image signal to be displayed at a remote location through said projection optics.

2. The projection television system according to claim 1, wherein said optics are aligned on said given axis which axis is the optical axis for said system.

3. The projection television system according to claim 1, wherein said projection television means includes means for converting said received signal into a television image display, which image display is projected via said projection optics to a remote location.

4. The projection television system according to claim 2, further including a projection screen positioned at said remote location and adapted to display said image.

5. The projection television system according to claim 2, wherein said means for transmitting is located below said projection television means wherein said optical axis is at a given angle with respect to the horizontal.

6. The projection television system according to claim 1, wherein said infrared television signal is a digitized composite color signal.

7. The projection television system according to claim 2, wherein said means for converting includes an infrared detector for converting said transmitted infrared signal into an electrical television signal.

8. The projection television system according to claim 6, wherein said infrared detector is a photodiode detector.

9. The projection television system according to claim 1, wherein means for transmitting includes three spatially separated transmitter diodes which transmit R, G and B signals, respectively, together with synchronizing signals, and that the projection unit contains three correspondingly spatially separated infrared detectors.

10. The projection television system according to claim 6, wherein said infrared detector is a multiple split element, and that from the individual output signals of the multiple split element, a signal is derived which corresponds to the distortion of the projected image.

11. The projection television system according to claim 10, including means responsive to the output signals of said multiple split element to provide a control signal which serves to automatically correct the distortion of said projected image.

* * * * *